US011858165B2

(12) United States Patent
De Rick

(10) Patent No.: US 11,858,165 B2
(45) Date of Patent: Jan. 2, 2024

(54) CUTTING DEVICE FOR A CONTINUOUS MILLING MACHINE AND METHOD FOR THE MANUFACTURE OF PANELS

(71) Applicant: FLOORING INDUSTRIES LIMITED, SARL, Bertrange (LU)

(72) Inventor: Jan De Rick, Geraardsbergen (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 147 days.

(21) Appl. No.: 17/431,985

(22) PCT Filed: Feb. 24, 2020

(86) PCT No.: PCT/IB2020/051535
§ 371 (c)(1),
(2) Date: Aug. 18, 2021

(87) PCT Pub. No.: WO2020/174358
PCT Pub. Date: Sep. 3, 2020

(65) Prior Publication Data

US 2022/0152864 A1 May 19, 2022

(30) Foreign Application Priority Data

Feb. 26, 2019 (BE) .................................. 2019/5121
Sep. 25, 2019 (BE) .................................. 2019/5638

(51) Int. Cl.
*E04F 15/00* (2006.01)
*B27F 1/06* (2006.01)
(Continued)

(52) U.S. Cl.
CPC ................ *B27F 1/06* (2013.01); *B27D 5/006* (2013.01); *B27M 3/04* (2013.01); *E04F 15/02* (2013.01)

(58) Field of Classification Search
CPC .... B27F 1/00; B27F 1/005; B27F 1/02; B27F 1/06; B27F 1/08; B27F 1/10; B27F 4/00;
(Continued)

(56) References Cited

U.S. PATENT DOCUMENTS 4,580,329 A * 4/1986 Bihler .................... B21D 35/00
72/449
10,933,592 B2 * 3/2021 Blomgren ............. B29C 66/824
(Continued)

FOREIGN PATENT DOCUMENTS

BE 1016561 A6 1/2007
BE 1024157 A1 11/2017
(Continued)

OTHER PUBLICATIONS

International Search Report and Written Opinion from PCT Application No. PCT/IB2020/051535, dated Jun. 19, 2020.
(Continued)

*Primary Examiner* — Chi Q Nguyen
(74) *Attorney, Agent, or Firm* — Workman Nydegger

(57) ABSTRACT

A cutting device for a continuous milling machine for the profiling of one or more edges of panels has a slide shoe or pressure shoe, which has a sliding surface or sliding surfaces for guiding a surface of a panel to be milled over it or them. The aforementioned slide shoe or pressure shoe is provided with at least one cutting blade for machining the panel; the cutting blade maintains a fixed position during this machining. The slide shoe or the pressure shoe is provided in order to support the surface of the panel to be milled by means of its sliding surface or sliding surfaces on a rotating milling cutter that carries out a milling operation on the edge of the panel.

18 Claims, 3 Drawing Sheets

(51) Int. Cl.

| | |
|---|---|
| ***B27D 5/00*** | (2006.01) |
| ***B27M 3/04*** | (2006.01) |
| ***E04F 15/02*** | (2006.01) |

(58) Field of Classification Search

CPC . B27D 1/00; B27D 5/00; B27D 5/006; B27M 3/04; E04F 15/02; E04F 15/02005; E04F 15/02011

See application file for complete search history.

(56) References Cited

U.S. PATENT DOCUMENTS

| | | | | |
|---|---|---|---|---|
| 2011/0023302 | A1* | 2/2011 | Pervan | B27F 1/06 29/897.3 |
| 2015/0153724 | A1* | 6/2015 | Platt | G06Q 30/0621 700/98 |
| 2016/0129573 | A1* | 5/2016 | Anstett | E04F 21/22 227/148 |
| 2016/0153200 | A1* | 6/2016 | Pervan | E04F 15/102 52/582.2 |
| 2016/0201336 | A1* | 7/2016 | Pervan | E04F 15/02038 52/582.2 |
| 2018/0001509 | A1* | 1/2018 | Myllykangas | B27G 13/08 |
| 2018/0001510 | A1* | 1/2018 | Fransson | B27G 13/005 |
| 2018/0002933 | A1* | 1/2018 | Pervan | E04F 15/102 |
| 2019/0240860 | A1* | 8/2019 | Hanses | B27D 1/10 |
| 2019/0262915 | A1* | 8/2019 | Pervan | B27F 1/06 |
| 2019/0299483 | A1* | 10/2019 | Dawidziak | B27F 1/06 |

FOREIGN PATENT DOCUMENTS

| | | | |
|---|---|---|---|
| CN | 107735234 | A | 2/2018 |
| DE | 7300177 | U | 7/1973 |
| DE | 102013006262 | A1 | 10/2014 |
| EP | 1764198 | A1 | 3/2007 |
| EP | 2789434 | A1 | 10/2014 |
| WO | 9747834 | A1 | 12/1997 |
| WO | 2006103565 | A2 | 10/2006 |
| WO | 2011077311 | A2 | 6/2011 |
| WO | 2017187298 | A2 | 11/2017 |

OTHER PUBLICATIONS

Belgian Search Report from corresponding BE Application No. BE201905121, dated Oct. 18, 2019.

Belgian Search Report from corresponding BE Application No. BE201905638, dated Apr. 29, 2020.

* cited by examiner

CUTTING DEVICE FOR A CONTINUOUS MILLING MACHINE AND METHOD FOR THE MANUFACTURE OF PANELS

BACKGROUND

The present invention relates to a slide shoe or pressure shoe for a continuous milling machine, to a cutting device for a continuous milling machine as well as to methods for the manufacture of panels wherein said slide shoes or pressure shoes, cutting devices and continuous milling machines may be used.

It is known per se, for example from WO 97/47834, WO 2006/103565 and WO 2011/077311, that panels such as floor panels can be profiled on their edges by means of a milling operation. In the case of floor panels, for example, profiles can be formed that comprise mechanical coupling means and/or lowered edge regions or chamfers such as a bevelled edge. The milling operation is in this case carried out by means of one or more rotating milling cutters in a continuous milling machine. In WO 2006/103565 it is disclosed that for this purpose the panels can be directed with their decorative surface downwards and can be transported by means of a chain, with projections, through the continuous milling machine while they are profiled on one or both for example long edges by means of the aforementioned milling cutters. At the location of the rotating milling cutters, the decorative surface is led over the sliding surface of a so-called slide shoe, while the panel is held on the opposite surface against the chain by means of the sliding surface of a pressure shoe. An accurate milling operation can be obtained in this way. For the milling of coupling means, as known from the aforementioned international patent applications, usually at least three rotating milling cutters are used. If a chamfer such as a bevelled edge is desired, a fourth motor position is occupied by a tool that mills or cuts the bevelled edge. Such an arrangement limits the throughput speed, but is often the only solution when for example working with a continuous milling machine that is only provided with four motor positions on each edge.

SUMMARY

The present invention aims to offer a more economic solution for the profiling of the edges of panels.

A first independent aspect of the invention relates to a slide shoe or pressure shoe for a continuous milling machine for the profiling of one or more edges of panels, wherein the slide shoe or pressure shoe in question has a sliding surface or sliding surfaces for guiding a surface of a panel to be milled over it or them, with the characteristic feature that the aforementioned slide shoe or pressure shoe is provided with at least one cutting blade.

A second independent aspect is a cutting device for a continuous milling machine for the profiling of one or more edges of panels. The cutting device comprises a slide shoe or pressure shoe. The slide shoe or pressure shoe in question has a sliding surface or sliding surfaces for guiding a surface of a panel to be milled over it or them. The aforementioned slide shoe or pressure shoe is provided with at least one cutting blade for machining the panel. This cutting blade maintains a fixed position during this machining. The slide shoe or the pressure shoe is provided in order to support the surface of the panel to be milled by means of its sliding surface or sliding surfaces on a rotating milling cutter that carries out a milling operation on the edge of the panel.

Preferably the cutting device comprises a rotating milling cutter for the milling of the panel at the location of the slide shoe or the pressure shoe.

Because the cutting blade—in the first and in the second aspect of the invention—is provided on a slide shoe or a pressure shoe, the positioning of the cutting surface of the cutting blade relative to the panel edge can be set accurately. Preferably the cutting blade is provided on a slide shoe, namely on a shoe that forms a sliding surface or sliding surfaces for the decorative side of the panel. Preferably said slide shoe is itself fixed on the bed (French: bâti) of the continuous milling machine. The sliding surface of such a slide shoe is preferably oriented in the same or almost the same direction as the fixed transport element of the continuous milling machine, for example such as in the same or almost the same direction as the chain. As can be seen from the first and second aspect it is also possible to provide the cutting blade on a pressure shoe, namely on a shoe that forms a sliding surface for the underside of the panel, and which has a sliding surface oppositely oriented on the fixed transport element of the continuous milling machine. A pressure shoe is preferably mounted somewhat springy, for example pressed against the rear of the panel by means of one or more pneumatic cylinders.

The cutting blade on the slide shoe or pressure shoe can have one or more functions. Thus, for example it may be used for providing a chamfer or bevelled edge, so that the occupying of a motor position becomes unnecessary for this. Instead, the motor position that is now free can be occupied by an extra rotating milling cutter and the material to be removed can be distributed more uniformly among the available rotating milling cutters. In this way the required power for driving these milling cutters can be reduced, and/or the throughput speed of the milling machine can be increased.

The slide shoe or pressure shoe preferably comprises a one-piece component. This one-piece component comprises a sliding surface or sliding surfaces to support the panel both before and after the position where the rotating milling cutter can carry out the milling operation on the edge of the panel.

The slide shoe or the pressure shoe may comprise two individual components. The first component comprises a sliding surface to support the panel before the position where the rotating milling cutter can carry out the milling operation on the edge of the panel. The second component comprises a sliding surface to support the panel after the position where the rotating milling cutter can carry out the milling operation on the edge of the panel.

According to the invention, the best positioning accuracy can be obtained by providing the cutting blade in question on a slide shoe which itself is fixed on the bed of the machine.

Preferably the aforementioned cutting blade occupies a fixed position with respect to the sliding surface of the aforementioned slide shoe or pressure shoe, or at the very least this position can be fixed during use thereof. According to another possibility, the aforementioned cutting blade can be mounted movably, for example for the obtaining of special decorative effects, for example such as a bevelled edge with a geometry that varies along the edge in question.

Preferably the position of the aforementioned cutting blade with respect to the aforementioned sliding surface is configured as adjustable. Thus, for example the aforementioned position may be configured as adjustable on the basis of one or more set screws, and the aforementioned cutting blade may preferably be fixed in the respective position obtained. Preferably the cutting blade in question is positionable at least in a direction perpendicular to the surface of the panel in question or transverse/perpendicular to the sliding surface, and/or at least in a direction H in the plane of the panel in question or in the sliding surface and at right angles to the edge of the panel to be machined. The positionability of the cutting blade in question is preferably independent of, or relative to the sliding surface of the slide shoe or pressure shoe on which the cutting blade in question is provided.

Preferably the aforementioned cutting blade has a cutting surface that makes an angle with a surface of the panel to be milled.

Preferably the cutting blade is intended to remove a portion of the decorative surface of the panel in question, for example for forming a lowered edge region, such as a chamfer or bevelled edge.

Preferably the aforementioned cutting blade relates to a non-rotating cutting blade, or scraping blade. Preferably it relates in each case to a single cutting blade on each of the edges of the panel, which are machined by the continuous milling machine in a single pass. When for example it relates to a so-called double-end tenoner, there are preferably on each of the two edges of the continuous milling machine at least one, and preferably just one, cutting blade that machines the respective edge of the panel. According to another possibility, said cutting blade may form part of a blade block with several such cutting blades, which preferably have a different geometry from one another, preferably so that, viewed in the direction of travel of the continuous milling machine, a second blade machines edge portions of the panel that are not machined by a first blade. Thus, for example a number of blades may be used after one another, which in each case machine or remove additional edge portions of the panel.

According to a variant, and an independent third aspect of the present invention, the invention relates to a continuous milling machine for the profiling of one or more edges of panels, wherein the continuous milling machine is provided with at least one non-rotating cutting blade that occupies a fixed position with respect to the machine bed, more particularly is fastened directly or via a slide shoe on the machine bed.

A fourth aspect of the invention relates to a continuous milling machine for the profiling of one or more edges of panels. The continuous milling machine comprises a cutting device as in the second aspect of the invention. The continuous milling machine comprises positions with additional rotating milling cutters for machining the edge of the panel that can be machined by the cutting device.

It is clear that a configuration of the third and/or fourth aspect wherein a non-rotating cutting blade is provided on a slide shoe displays or may display the same advantages as mentioned in the context of the first aspect of the invention. If a non-rotating cutting blade is provided fixed on the machine bed in some other way, the accuracy may possibly be more limited. However, such an arrangement is for example interesting when the non-rotating cutting blade in question is intended for carrying out a roughing operation. Thus, for example if an edge of a panel is to be provided finally with a groove with a lower and an upper groove lip, wherein one of the groove lips, for example the lower groove lip, projects beyond the other, for example the upper groove lip, the portion of the panel to be removed at the location of the projecting lip portion is removed with said cutting blade. After that, finer machining operations may then be employed, preferably based on rotating cutters for forming the final surfaces of the respective groove. This may for example be the groove of a locking tooth-in-groove joint, such as is known per se from the aforementioned WO 97/47834. By removing a portion of the material to be removed by means of said roughing operation, the required power for removing the rest of the material for forming the final groove surfaces can be limited, or the throughput speed can be raised without necessarily affecting the life of the rotating milling cutters. The life of the blade used is not or is hardly of importance. Firstly it relates to a roughing operation, and secondly owing to the low required accuracy it can easily be replaced.

With the same purpose as with the first, second, third and fourth aspect of the invention, according to an independent fifth aspect the present invention relates to a method for the manufacture of panels, wherein these panels have a profiled edge region on one or more edges and the method at least comprises the step of forming the profiled edge region in question at least by means of one or more rotating milling cutters in a continuous milling machine, wherein the panel to be milled is transported with its surface over the sliding surface or the sliding surfaces of at least one slide shoe or pressure shoe, with the characteristic feature that the method further comprises the step of forming a portion of the profiled edge region in question on the basis of a non-rotating cutting tool, wherein the aforementioned non-rotating cutting tool at least consists of a cutting blade that is provided on the aforementioned slide shoe or pressure shoe and/or is fixed firmly to the machine bed.

It is clear that in the method of the fifth aspect preferably a slide shoe or pressure shoe with the characteristic features of the first aspect is applied, and/or a cutting device according to the second aspect of the invention and/or a continuous milling machine with the characteristic features of the third or fourth aspect.

The sixth aspect of the invention relates to a method for the manufacture of panels wherein a continuous milling machine is used, as in the fourth aspect of the invention. These panels have, on one or more edges, a profiled edge region wherein the forming of the profiled edge region in question is carried out at least by means of one or more of the additional rotating milling cutters. The panel to be milled is transported with its surface over the sliding surface or the sliding surfaces of the slide shoe or pressure shoe. The method comprises the step of forming a portion of the profiled edge region in question by means of the cutting blade that is provided on the aforementioned slide shoe or pressure shoe.

Preferably, in methods according to the fifth aspect of the invention and in methods according to the sixth aspect of the invention, at the location of the aforementioned slide shoe or pressure shoe and/or at the location of the installed cutting blade, a milling operation is also carried out on the respective edge by means of a rotating milling cutter. "At the location of" means that the slide shoe or pressure shoe in question guides, with the cutting blade, the edge of the floor panel to be machined by means of its sliding surface or sliding surfaces at the location of the engagement of the rotating milling cutter and/or that one and the same pressure shoe guides the edge of the floor panel by means of its sliding surface or sliding surfaces at the location of the engagement of the cutting blade and rotating milling cutter. According to a variant, the edge of the floor panel may be guided at the location of the cutting blade by an individual pressure shoe, which is mounted independently of any pressure shoe that guides the edge of the panel at the location of a rotating milling cutter.

Preferably the rotating milling cutter engages in the edge of the panel so that the milling cutter, while it engages in the edge of the panel, turns away from the position of the cutting blade. These embodiments have the advantage that material and chips formed by the rotating milling cutter are led away from the cutting blade, so that the cutting blade can make a qualitatively better cut edge in the panel, while the efficiency of the process is also improved.

Preferably, at least three or four, or just three or four rotating milling cutters, and the aforementioned cutting blade are used for forming the aforementioned profiled edge region. This embodiment is particularly interesting in the cases wherein a continuous milling machine is used that is only provided with four motor positions on each edge.

As already mentioned, the aforementioned profiled edge region, at the location of at least one of the principal surfaces of the panel, preferably has a chamfer, for example in the form of a bevelled edge, wherein the surface of the chamfer in question is formed at least partially, but preferably exclusively, by the aforementioned cutting blade. Preferably said bevelled edge is located on the decorative surface of the panel in question. Said bevelled edge may extend at an angle from 5 to 65° to the horizontal. According to a first particular embodiment it extends at an angle from 5 to 15° to the horizontal. With said chamfer or bevelled edge, any height difference at the location of the seam between two panels, owing to a different thickness of the adjacent panels, can be masked satisfactorily. Preferably the surface of said bevelled edge is free from intersections with an optional decorative layer that may be present on the surface of said panel. Preferably the depth of said bevelled edge is thus limited at most to the thickness of any transparent or translucent wearing layer applied on top of said decorative layer. According to a second particular embodiment it extends at an angle from 40 to 65° to the horizontal. In that case the surface of the bevelled edge preferably intersects well with any decoration present on the surface of the panels in question. Said bevelled edges may be for the purpose of singling out the panel in question more noticeably in a surface formed by several such floor panels and/or can conceal gaps between adjacent panels. Of course, they are also effective in concealing height differences at the location of a seam between adjacent panels.

It is clear from the foregoing that the aforementioned panels are preferably provided on at least one of the principal surfaces with a covering, preferably at least formed by a transparent thermoplastic layer, for example polyvinyl chloride layer, preferably with an underlying decoration or decorative layer. Said decorative layer may for example be formed by a printed thermoplastic film. According to another embodiment the aforementioned panels are provided on at least one of the principal surfaces with a wooden or stone covering, such as a wood veneer or stone veneer, for example with a thickness between 0.3 and 1 millimeter, or with a thickness of 2.5 millimeters or more.

Preferably the aforementioned panels have a substrate material that comprises mineral constituents, preferably with a content of mineral constituents that is at least 40 wt %, and better still is at least 60 wt %. The aforementioned mineral constituents may for example comprise at least lime, limestone or talc. According to another example, the aforementioned panels have a substrate material based on cement, such as based on Portland cement or magnesium oxide cement. For panels with a high content of mineral constituents, machining of the edges requires a significant motor power when it is desired to operate at economic throughput speeds, for example at throughput speeds greater than 45 m/min, or 80 m/min or more, for example at about 120 m/min or more. These higher speeds are mainly desired when machining the long pair of opposite edges of rectangular floor panels.

Preferably the aforementioned panels have a substrate material that comprises thermoplastic material, preferably rigid polyvinyl chloride (PVC), namely preferably PVC with a plasticizer content below 5 phr. Such panels may have a content of mineral constituents or other fillers that is at least 40 wt %, and better still is at least 60 wt %. It may be lime, limestone, talc, wood, bamboo and the like. The presence of rigid PVC requires in particular a significant motor power when it is desired to obtain economic throughput speeds in the order of magnitude as stated above.

It is clear that the aforementioned profiled edge region may comprise a coupling means, with which the panel in question can interact with one or more edges of similar panels. Preferably the coupling means is at least partially formed by the milling operation with the rotating milling cutter. Preferably they are rectangular floor panels, wherein the opposite long edges are mainly configured as a locking tooth-in-groove joint.

BRIEF DESCRIPTION OF THE DRAWINGS

With the aim of better illustrating the features of the invention, some preferred embodiments are described hereunder, as examples without any limiting character, referring to the appended drawings, in which.

DETAILED DESCRIPTION OF VARIOUS EMBODIMENTS

Figure 1:
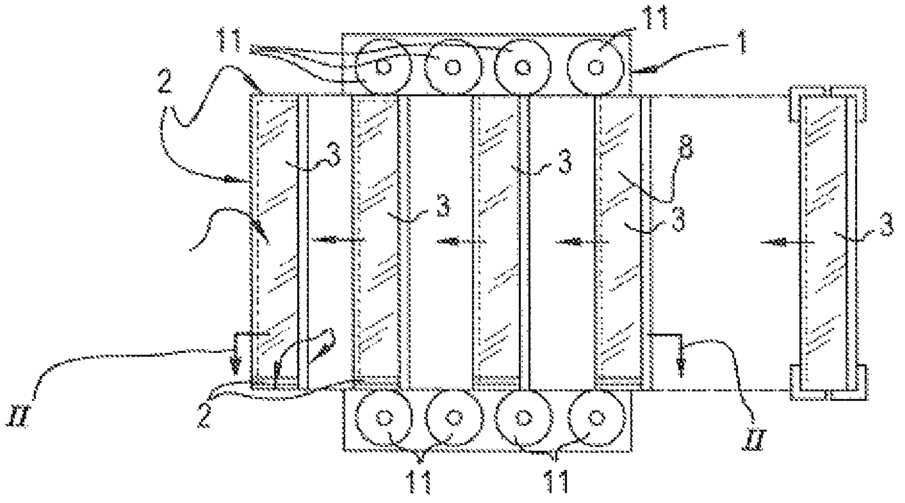
FIG. 1 shows a method for the manufacture of panels with the characteristic features of the present invention.

FIG. 1 shows a top view of a continuous milling machine 1 for the profiling of one or more edges 2 of panels 3. In this case it relates to a continuous milling machine of the double-end-tenoner type for the milling of the short opposite edges of rectangular floor panels. The principles of the invention may be translated mutatis mutandis to a similar milling machine for the profiling of the opposite long edges.

Figure 3:
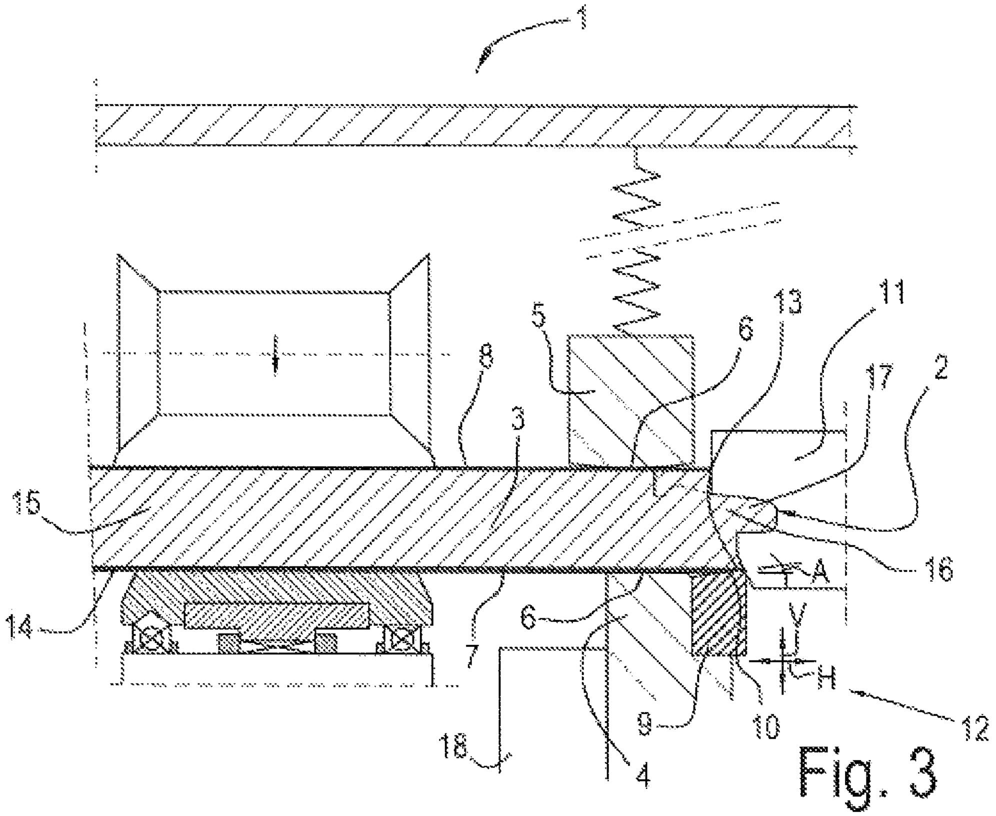
FIG. 3 shows a cross-section along line shown in FIG. 2.
Figure 2:
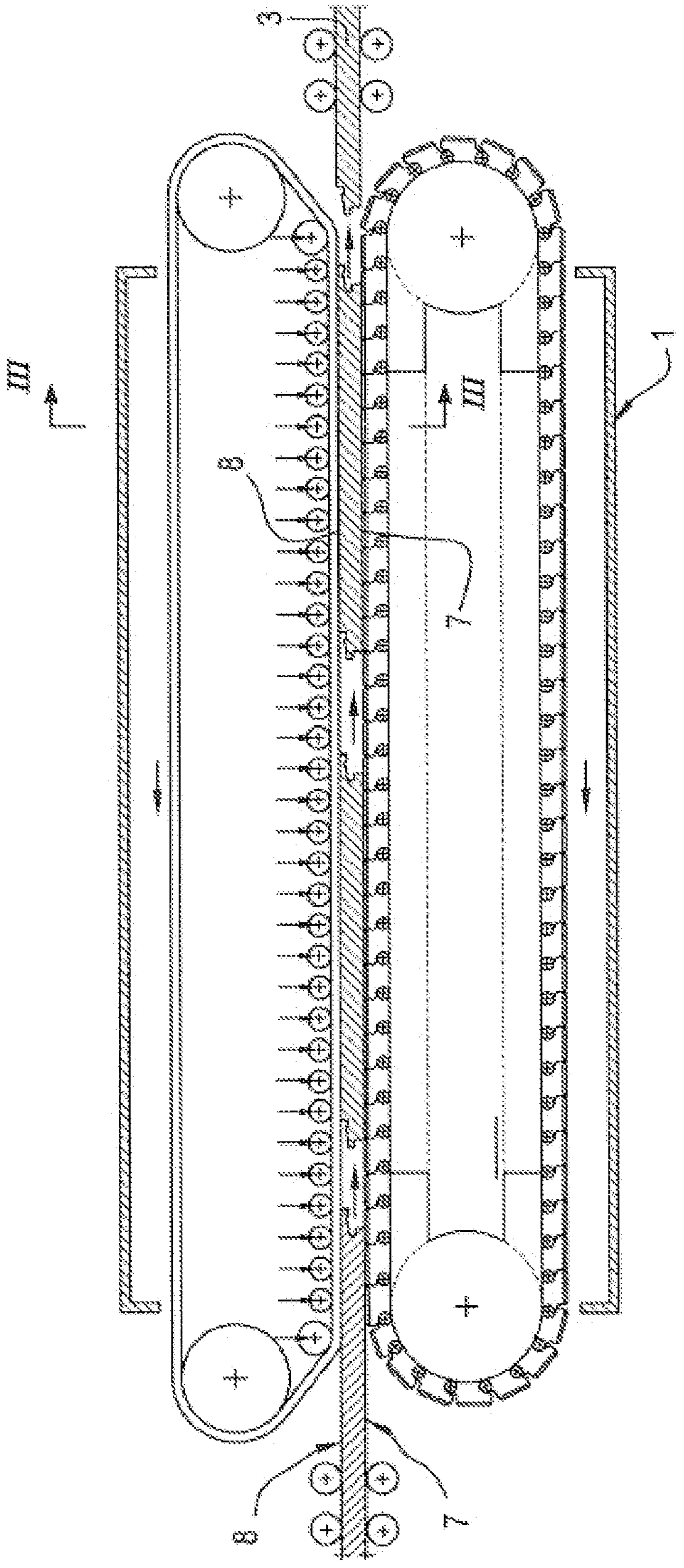
FIG. 2 shows a cross-section along line II-II shown in FIG. 1.

FIGS. 2 and 3 show further views of the same continuous milling machine 1. The references used, if not defined here, are defined in the appended claims.

In particular, it is shown in FIG. 3 that at the location of the cutting blade 9, a rotating milling cutter 11 is active for machining the edge 2. The edge 2 is supported for both machining operations by sliding surfaces 6 of the same slide shoe 4 and pressure shoe 5.

It is not shown in the example that the opposite edge 2 of the panel for example is machined similarly, namely at least with one non-rotating cutting blade 9 that forms a bevelled edge 13, with the difference that the coupling means 16 on the opposite edge 2 is configured as a groove instead of a tooth 17 in the case of the edge illustrated.

It is clear that in the embodiment illustrated, the cutting blade 9 is provided on the slide shoe 4, and that it can be provided, mutatis mutandis, on the pressure shoe 5. It is not necessary that a cutting blade 9 that is provided on the slide shoe 4, or respectively pressure shoe 5, machines the surface 7, or respectively surface 8, that is led over the sliding surface 6 of the respective slide shoe 4. It is namely possible that a cutting blade 9 mounted on the slide shoe 4 machines the opposite surface 8, for example because the cutting blade 9 in question machines the opposite surface 8 via a bridge that bridges over the thickness of the panel, and vice versa for a cutting blade mounted on the pressure shoe 5. Furthermore, it is also possible that the cutting blade 9 is used for machining a portion of the substrate 15, without a portion of the surfaces 7-8 necessarily being removed for this. The substrate 15 may be provided with a coating, for example formed by a transparent thermoplastic layer 14. The cutting blade 9 may, as stated in the introduction, be used as a roughing operation. As stated in the introduction, such a blade may also be fixed firmly to the machine bed 18 in some other way. The machine bed 18 is only shown schematically in FIG. 3, but a person skilled in the art is sufficiently aware that a machine bed 18 relates to the reference construction of the continuous milling machine 1.

Figure 4:
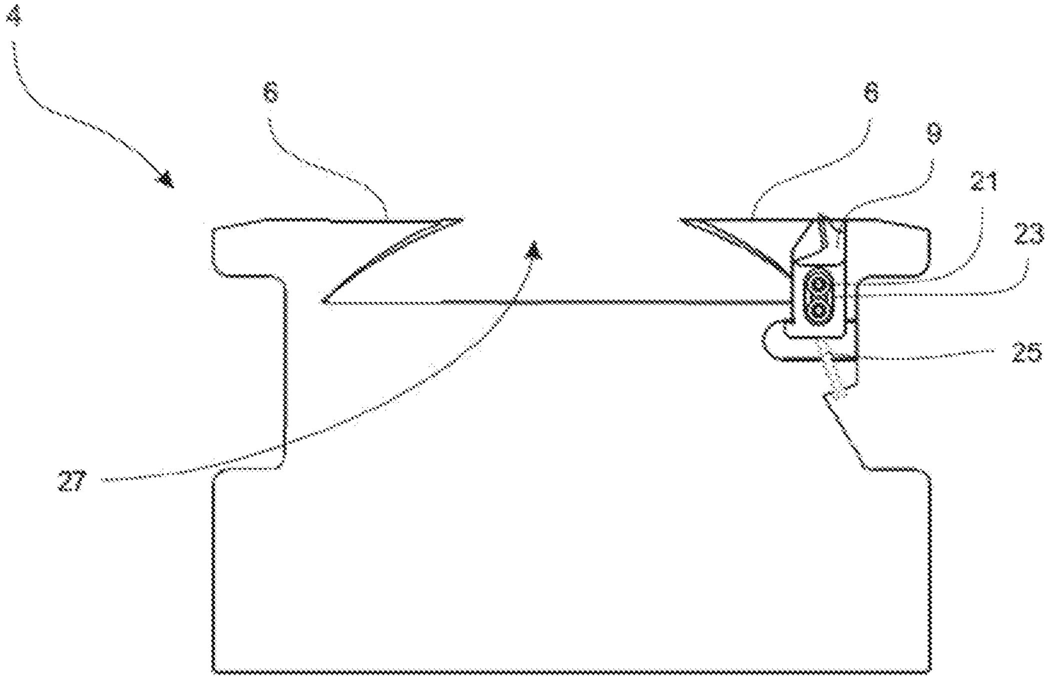
FIG. 4 shows a detail view along line II-II shown in FIG. 1, of a first embodiment of a cutting device according to the invention.

FIG. 4 shows a detail view along line II-II shown in FIG. 1 of a first embodiment of a cutting device according to the invention. The slide shoe 4 in FIG. 4 is made as one piece. The slide shoe 4 has sliding surfaces 6 for guiding a surface of a panel to be milled over them. A cutting blade 9 is fastened to this slide shoe 4. The cutting blade 9 is fastened to the slide shoe 4 by means of two bolts 21 in a slot 23 of the cutting blade. By loosening these two bolts 21, the vertical position of the cutting blade 9 can be adjusted by means of a set screw 25 placed obliquely, after which the cutting blade is fixed to the slide shoe with the two bolts. The slide shoe is configured so that space 27 is available for mounting of and the operation of a rotating milling cutter. The one-piece slide shoe can, by means of its sliding surfaces, support the panel in the positions before and after the engagement of the rotating milling cutter. This milling cutter is not shown in FIG. 4. At the location of this slide shoe, a milling operation may thus be carried out by means of a rotating milling cutter, simultaneously with the forming of a portion of the profiled edge region of the panel by means of the cutting blade 9.

Figure 5:
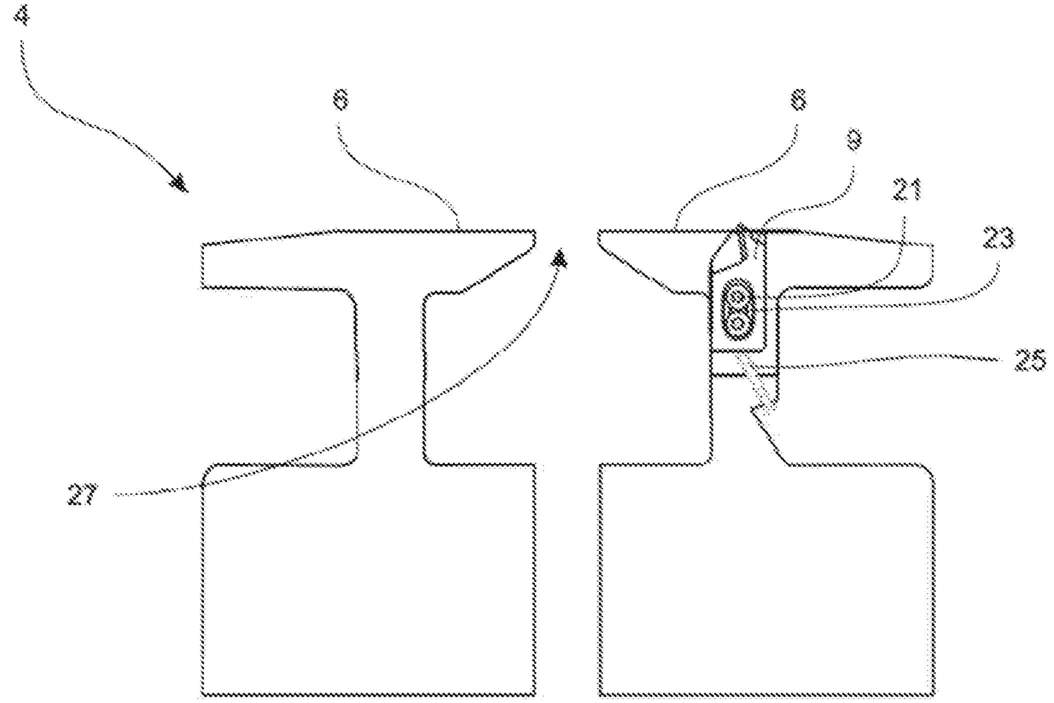
FIG. 5 shows a detail view along line II-II shown in FIG. 1, of a second embodiment of a cutting device according to the invention.

FIG. 5 shows a detail view along line II-II shown in FIG. 1 of a second embodiment of a cutting device according to the invention. The slide shoe 4 from FIG. 4 is made in two parts. The slide shoe 4 has sliding surfaces 6 for guiding a surface of a panel to be milled over them. A cutting blade 9 is fastened to this slide shoe 4. The cutting blade 9 is fastened to the slide shoe 4 by means of two bolts 21 in a slot 23 of the cutting blade. By loosening these two bolts 21, the vertical position of the cutting blade 9 can be adjusted by means of a set screw 25 placed obliquely, after which the cutting blade is fixed to the slide shoe with the two bolts. The slide shoe is configured so that space 27 is available for the mounting and operation of a rotating milling cutter. This milling cutter is not shown in FIG. 5. At the location of this slide shoe, a milling operation may thus be carried out by means of a rotating milling cutter, simultaneously with the forming of a portion of the profiled edge region of the panel by means of the cutting blade 9. The one part of the slide shoe can support the panel by means of its sliding surface for engagement of the rotating cutting tool, whereas the other part of the slide shoe can support the panel by means of its sliding surface after engagement of the rotating cutting tool.

The present invention is by no means limited to the embodiments described above, and such slide shoes and/or pressure shoes, cutting devices, continuous milling machine and methods for the manufacture of panels can be realized while remaining within the scope of the present invention.

The invention claimed is:

1. A method for manufacturing panels wherein a continuous milling machine is used for machining a panel, wherein the continuous milling machine comprises a cutting device; and wherein the continuous milling machine comprises positions with additional rotating milling cutters for machining an edge of the panel by the cutting device;

wherein the cutting device comprises a slide shoe or pressure shoe, wherein the slide shoe or pressure shoe has at least one sliding surface for guiding a surface of the panel to be milled, wherein the slide shoe or pressure shoe is provided with at least one cutting blade for machining the panel, wherein this cutting blade maintains a fixed position during this machining;

wherein the slide shoe or the pressure shoe is provided in order to support the surface of the panel to be milled by means of the at least one sliding surface on a rotating milling cutter that carries out a milling operation on the edge of the panel;

wherein the cutting device comprises a rotating milling cutter for the milling of the panel at a location of the slide shoe or the pressure shoe;

wherein the rotating milling cutter is provided upstream of the cutting blade;

wherein the method comprises the step of providing the panels with a profiled edge region on one or more of the edges, wherein forming of the profiled edge region is carried out at least by means of one or more of the additional rotating milling cutters and by the rotating milling cutter, and wherein the panel to be milled is guided with a surface of the panel over the at least one sliding surface of the slide shoe or pressure shoe, wherein the method comprises the step of forming a portion of the profiled edge region by means of the cutting blade that is provided on the slide shoe or pressure shoe.

2. The method of claim 1, wherein at the location of the slide shoe or pressure shoe, a milling operation is carried out on the edge by means of the rotating milling cutter, wherein the sliding surface or the sliding surfaces of the slide shoe or pressure shoe support the surface of the panel to be milled on the rotating milling cutter.

3. The method of claim 2, wherein the rotating milling cutter engages in the edge of the panel so that the rotating milling cutter, while engaging the edge of the panel, turns away from the position of the cutting blade.

4. The method of claim 1, wherein the profiled edge region has, at a location of at least one principal surface of the panel, a chamfer or a beveled edge, wherein the surface of the chamfer or of the beveled edge is formed by the cutting blade.

5. The method of claim 1, wherein the profiled edge region comprises coupling parts arranged to interact with one or more edges of similar panels;

wherein the coupling parts are formed by the milling operation with the rotating milling cutter.

6. The method of claim 1, wherein the panels are provided on at least one principal surface with a coating.

7. The method of claim 6, wherein the coating is formed by a transparent thermoplastic layer.

8. The method of claim 1, wherein the panels have a substrate material that comprises mineral constituents.

9. The method of claim 1, wherein the panels have a substrate material that comprises thermoplastic material or rigid polyvinyl chloride (PVC) or polyvinyl chloride (PVC) with a plasticizer.

10. The method of claim 1, wherein a plurality of rotating milling cutters, and the cutting blade, are used for forming the profiled edge region.

11. The method of claim 1, wherein the slide shoe or pressure shoe comprises a one-piece component;

wherein the one-piece component comprises the at least one sliding surface in order to support the panel both before and after the position where the rotating milling cutter can carry out the milling operation on the edge of the panel.

12. The method of claim 1, wherein the slide shoe or the pressure shoe comprises first and second components;

wherein the first component comprises the sliding surface to support the panel before the position where the rotating milling cutter can carry out the milling operation on the edge of the panel; and wherein the second component comprises a sliding surface to support the panel after the position where the rotating milling cutter can carry out the milling operation on the edge of the panel.

13. The method of claim 1, wherein the position of the cutting blade with respect to the at least one sliding surface is configured to be controllable.

14. The method of claim 13, wherein the position is controllable by one or more set screws.

15. The method of claim 1, wherein the cutting blade has a cutting surface that makes an angle (A) with a surface of the panel to be milled.

16. A method for manufacturing panels wherein a continuous milling machine is used for machining a panel, wherein the continuous milling machine comprises a cutting device; and wherein the continuous milling machine comprises positions with additional rotating milling cutters for machining an edge of the panel by the cutting device;

wherein the cutting device comprises a slide shoe or pressure shoe, wherein the slide shoe or pressure shoe has at least one sliding surface for guiding a surface of the panel to be milled, wherein the slide shoe or pressure shoe is provided with at least one cutting blade for machining the panel, wherein this cutting blade maintains a fixed position during this machining;

wherein the slide shoe or the pressure shoe is provided in order to support the surface of the panel to be milled by means of the at least one sliding surface on a rotating milling cutter that carries out a milling operation on the edge of the panel;

wherein the cutting device comprises a rotating milling cutter for the milling of the panel at a location of the slide shoe or the pressure shoe;

wherein the rotating milling cutter is provided upstream of the cutting blade;

wherein the method comprises the step of providing the panels with a profiled edge region on one or more edges, wherein forming of the profiled edge region is carried out at least by means of one or more of the additional rotating milling cutters and by the rotating milling cutter, and wherein the panel to be milled is guided with a surface of the panel over the at least one sliding surface of the slide shoe or pressure shoe, wherein the method comprises the step of forming a portion of the profiled edge region by means of the cutting blade that is provided on the slide shoe or pressure shoe;

wherein at the location of the slide shoe or pressure shoe, a milling operation is carried out on the edge by means of the rotating milling cutter, wherein the sliding surface or the sliding surfaces of the slide shoe or pressure shoe support the surface of the panel to be milled on the rotating milling cutter, wherein the profiled edge region has, at a location of at least one principal surface of the panel, a chamfer or a bevelled edge, wherein the surface of the chamfer or of the bevelled edge is formed by the cutting blade.

17. The method of claim 16, wherein the profiled edge region comprises coupling parts, arranged to interact with one or more edges of similar panels;

wherein the coupling parts are formed by the milling operation with the rotating milling cutter.

18. The method of claim 17, wherein the panels have a substrate material that comprises thermoplastic material, wherein the substrate material comprises mineral constituents in an amount of at least 40 percent by weight.

* * * * *